(12) United States Patent
Kwak et al.

(10) Patent No.: US 11,114,245 B2
(45) Date of Patent: Sep. 7, 2021

(54) CERAMIC DIELECTRIC AND METHOD OF MANUFACTURING THE SAME AND CERAMIC ELECTRONIC COMPONENT AND ELECTRONIC DEVICE

(71) Applicants: SAMSUNG ELECTRONICS CO., LTD., Suwon-si (KR); Korea Institute of Ceramic Engineering and Technology, Jinju-si (KR)

(72) Inventors: Chan Kwak, Yongin-si (KR); Myoung Pyo Chun, Anyang-si (KR); Hyeon Cheol Park, Hwaseong-si (KR); Daejin Yang, Yeongju-si (KR)

(73) Assignees: SAMSUNG ELECTRONICS CO., LTD., Gyeonggi-Do (KR); KOREA INSTITUTE OF CERAMIC ENGINEERING AND TECHNOLOGY, Gyeongsangnam-Do (KR)

( * ) Notice: Subject to any disclaimer, the term of this patent is extended or adjusted under 35 U.S.C. 154(b) by 21 days.

(21) Appl. No.: 16/507,492

(22) Filed: Jul. 10, 2019

(65) Prior Publication Data

US 2020/0243262 A1    Jul. 30, 2020

(30) Foreign Application Priority Data

Jan. 29, 2019    (KR) .......................... 10-2019-0011402

(51) Int. Cl.
*C04B 35/47*    (2006.01)
*H01G 4/12*    (2006.01)
(Continued)

(52) U.S. Cl.
CPC ....... *H01G 4/1281* (2013.01); *C04B 35/4682* (2013.01); *C04B 35/47* (2013.01);
(Continued)

(58) Field of Classification Search
CPC . C04B 35/6262; C04B 35/47; C04B 35/4682; C04B 35/468; C04B 2235/3217;
(Continued)

(56) References Cited

U.S. PATENT DOCUMENTS 3,426,251 A * 2/1969 Prokopowicz ....... H01G 4/1272
361/321.1
4,323,617 A    4/1982 Mandai et al.
(Continued)

FOREIGN PATENT DOCUMENTS

KR    100631894 B1    10/2006
KR    101615071 B1    4/2016

*Primary Examiner* — Noah S Wiese
(74) *Attorney, Agent, or Firm* — Cantor Colburn LLP

(57) ABSTRACT

A method of manufacturing a ceramic dielectric, including: heat-treating a barium precursor or a strontium precursor, a titanium precursor, and a donor element precursor to obtain a conducting or semiconducting oxide, preparing a mixture including the conducting or semiconducting oxide and a liquid-phase acceptor element precursor, and sintering the mixture to form a ceramic dielectric, wherein the ceramic dielectric includes a plurality of grains and a grain boundary between adjacent grains, and wherein the plurality of grains including an insulating oxide comprising an acceptor element derived from the acceptor element precursor.

18 Claims, 13 Drawing Sheets

(51) Int. Cl.
*H01G 4/30* (2006.01)
*H01G 4/228* (2006.01)
*C04B 35/626* (2006.01)
*C04B 35/468* (2006.01)
*H01G 4/005* (2006.01)

(52) U.S. Cl.
CPC ......... *C04B 35/6262* (2013.01); *H01G 4/005* (2013.01); *H01G 4/228* (2013.01); *H01G 4/30* (2013.01)

(58) Field of Classification Search
CPC .... C04B 2235/3224; C04B 2235/3206; C04B 2235/3225; C04B 2235/3298; C04B 2235/85; C04B 2235/3227; C04B 2235/3262
See application file for complete search history.

(56) References Cited

U.S. PATENT DOCUMENTS

| | | | |
|---|---|---|---|
| 4,870,539 A * | 9/1989 | Chance | C04B 35/4682 361/321.5 |
| 2006/0121258 A1 | 6/2006 | Kim et al. | |
| 2009/0149312 A1* | 6/2009 | Aman | C04B 35/49 501/137 |
| 2016/0225527 A1* | 8/2016 | Kawamoto | H01G 4/1281 |
| 2017/0186548 A1* | 6/2017 | Sato | C04B 35/4682 |
| 2018/0061572 A1* | 3/2018 | Kano | H01G 4/1227 |
| 2018/0102224 A1 | 4/2018 | Rolin et al. | |

\* cited by examiner

CERAMIC DIELECTRIC AND METHOD OF MANUFACTURING THE SAME AND CERAMIC ELECTRONIC COMPONENT AND ELECTRONIC DEVICE

CROSS-REFERENCE TO RELATED APPLICATION

This application claims priority to and the benefit of Korean Patent Application No. 10-2019-0011402, filed in the Korean Intellectual Property Office on Jan. 29, 2019, the content of which is incorporated herein by reference in its entirety.

BACKGROUND

1. Field

A ceramic dielectric, a method of manufacturing the same, a ceramic electronic component, and an electronic device are disclosed.

2. Description of the Related Art

An electronic component such as a capacitor, an inductor, a piezoelectric device, a varistor, or a thermistor may each include a ceramic dielectric. A multilayer ceramic capacitor (MLCC), which is a type of capacitor, includes a plurality of capacitors and is formed in, for example, a chip shape, so that it may be mounted in a flexible printed circuit (FPC) of an imaging device such as a liquid crystal display (LCD), an electronic device such as a computer or a mobile phone, and the like, to charge and discharge electricity, and may also be used in a device for coupling, decoupling, or impedance matching, and the like.

It has become desirable to provide an electronic device having an improved function and reduced-size, which includes a ceramic electronic component, such as a multilayer ceramic capacitor, with improved performance and reduced-size.

SUMMARY

An embodiment provides a method of manufacturing a ceramic dielectric having improved permittivity and improved resistivity, simultaneously.

Another embodiment provides a ceramic dielectric obtained by the manufacturing method.

Yet another embodiment provides a ceramic electronic component including the ceramic dielectric.

Still another embodiment provides an electronic device including the ceramic electronic component.

According to an embodiment, a method of manufacturing a ceramic dielectric includes: heat-treating a barium precursor or a strontium precursor, a titanium precursor, and a donor element precursor to obtain a conducting or semiconducting oxide, preparing a mixture including the conducting or semiconducting oxide and a liquid-phase acceptor element precursor, and sintering the mixture to form a ceramic dielectric, wherein the ceramic dielectric includes a plurality of grains and a grain boundary between adjacent grains, wherein the plurality of grains including the conducting or semiconducting oxide and the grain boundary includes an insulating oxide including an acceptor element derived from the liquid-phase acceptor element precursor.

The liquid-phase acceptor element precursor may include a nitrate, a chloride or a combination thereof including an acceptor element, the acceptor element including manganese (Mn), magnesium (Mg), aluminum (Al), iron (Fe), scandium (Sc), gallium (Ga), or a combination thereof.

The nitrate, the chloride, or the combination thereof including the acceptor element may be dissolved or dispersed in water or an organic solvent.

The method may further include supplying a liquid-phase sintering agent to the mixture before the sintering.

The liquid-phase sintering agent may include tetramethylorthosilicate, tetraethylorthosilicate, tetramethylsilane, tetraethylsilane, a silicon (Si)-containing nitrate, a silicon (Si)-containing acetate, or a combination thereof.

The tetramethylorthosilicate, tetraethylorthosilicate, tetramethylsilane, tetraethylsilane, silicon (Si)-containing nitrate, silicon (Si)-containing acetate, or the combination thereof may be dissolved or dispersed in water or an organic solvent.

The liquid-phase sintering agent may be supplied in an amount which is less than an amount of the acceptor element precursor.

The mole ratio of the sintering agent to the acceptor element precursor may be about 0.1:1 to about 0.9:1.

The donor element precursor may include lanthanum (La), yttrium (Y), bismuth (Bi), dysprosium (Dy), gadolinium (Gd), neodymium (Nd), samarium (Sm), holmium (Ho), or a combination thereof.

The donor element precursor may be present in an amount of less than or equal to about 3 mole percent (mol %) based on a total amount of moles of the barium precursor or the strontium precursor, the titanium precursor, and the donor element precursor.

The mole ratio of the barium precursor or the strontium precursor to the titanium precursor may be about 0.8:1.2 to about 1.2:0.8.

The acceptor element precursor may be present in an amount of about 0.1 mol % to about 5 mol %, based on a total amount of moles in the mixture.

The method may further include compression-molding the mixture before the sintering of the mixture.

The method may further include heat-treating the ceramic dielectric at a temperature less than the sintering temperature after the sintering of the mixture.

According to another embodiment, a ceramic dielectric obtained according to the method is provided.

According to another embodiment, a ceramic dielectric includes: a plurality of grains comprising a conducting or semiconducting oxide comprising barium or strontium, titanium, and a donor element, and a grain boundary disposed between adjacent grains, the grain boundary comprising an insulating oxide comprising an acceptor element, the insulating oxide including an acceptor element substantially uniformly distributed in the grain boundary, wherein the donor element comprises lanthanum (La), yttrium (Y), bismuth (Bi), dysprosium (Dy), gadolinium (Gd), neodymium (Nd), samarium (Sm), holmium (Ho), or a combination thereof, and the acceptor element comprises manganese (Mn), magnesium (Mg), aluminum (Al), iron (Fe), scandium (Sc), gallium (Ga), or a combination thereof.

The grain boundary may further include a silicon element that is substantially uniformly distributed in the grain boundary.

According to another embodiment, a ceramic electronic component includes a pair of electrodes facing each other and a ceramic dielectric layer disposed between the pair of electrodes.

The ceramic electronic component may be a multilayer ceramic capacitor in which a plurality of unit capacitors including the pair of electrodes and the ceramic dielectric layer, are stacked.

According to another embodiment, an electronic device includes the ceramic electronic component.

An improved permittivity and resistivity of the ceramic electronic component may simultaneously be realized.

BRIEF DESCRIPTION OF THE DRAWINGS

The above and other advantages and features of this disclosure will become more apparent by describing in further detail exemplary embodiments thereof with reference to the accompanying drawings, in which.

DETAILED DESCRIPTION

Figure 1A:
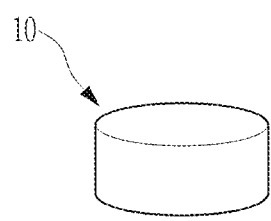
FIG. 1A is a schematic view showing a ceramic dielectric, according to an embodiment.

Hereinafter, example embodiments of the present disclosure will be described in detail so that a person skilled in the art would understand the same. This disclosure may, however, be embodied in many different forms and is not construed as limited to the example embodiments set forth herein.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a method of manufacturing a ceramic dielectric according to an embodiment is described.

A method of manufacturing a ceramic dielectric according to an embodiment includes obtaining a conducting or semiconducting oxide, preparing a mixture of the conducting or semiconducting oxide and a liquid-phase acceptor element precursor, and sintering the mixture to form a ceramic dielectric.

First, the conducting or semiconducting oxide is prepared.

The conducting or semiconducting oxide may be for example a dielectric having a conducting (conductive) property or semiconducting (semiconductive) property by doping barium titanate or strontium titanate with a donor element, and for example, may be prepared by calcinating a mixture of a barium precursor or a strontium precursor, a titanium precursor, and a donor element precursor.

The barium precursor may be a precursor supplying barium, for example, barium oxide (BaO), barium carbonate ($BaCO_3$), barium hydroxide ($Ba(OH)_2$), or a combination thereof. The strontium precursor may be a precursor supplying strontium, for example strontium oxide (SrO), strontium carbonate ($SrCO_3$), strontium hydroxide ($Sr(OH)_2$), or a combination thereof.

The titanium precursor may be a precursor supplying titanium, for example titanium dioxide ($TiO_2$), titanium carbonate ($TiCO_3$), titanium hydroxide ($Ti(OH)_4$), titanium acetate, or a combination thereof, and may be, for example $TiO_2$, $Ti(OH)_4$, or a combination thereof.

The donor element precursor may be, for example, a precursor supplying a donor element such as a rare earth element. For example, the donor element precursor may be an oxide of a donor element, a carbonate salt of a donor element, an acetate salt of a donor element, or a combination thereof, and may be for example, a compound having a structure of $M_2O_3$ $M_2CO_3$, or a combination thereof (wherein M is a donor element such as a rare earth element). The donor element may include, for example, lanthanum (La), yttrium (Y), bismuth (Bi), dysprosium (Dy), gadolinium (Gd), neodymium (Nd), samarium (Sm), holmium (Ho), or a combination thereof, but is not limited thereto.

The barium precursor or strontium precursor and the titanium precursor may be included in a mole ratio of the barium precursor or strontium precursor to the titanium precursor of about 0.8:1.2 to about 1.2:0.8, about 0.9:1.1 to about 1.1:0.9, or about 1:1.

The amount of the donor element precursor may be less than the amount of the barium precursor or the strontium precursor and the titanium precursor, for example, in an amount of less than or equal to about 5 mole percent (mol %) or for example, less than or equal to about 3 mol %, based on a total amount of moles of the barium precursor or the strontium precursor, the titanium precursor, and the donor element precursor. For example, the donor element precursor may be present in an amount of about 0.1 mol % to about 5 mol %, or about 0.1 to about 3 mol %, based on a total amount of moles of the barium precursor or the strontium precursor, the titanium precursor, and the donor element precursor.

The barium precursor or the strontium precursor, the titanium precursor, and the donor element precursor may be, for example, mixed together in a solvent, and the solvent may be, for example, an alcohol such as ethanol, but is not limited thereto.

The mixture including the barium precursor or the strontium precursor, the titanium precursor, and the donor element precursor may be dried at room temperature (RT) or at a temperature greater than a boiling point of the solvent.

The calcination of the mixture including the barium precursor or the strontium precursor, the titanium precursor, and the donor element precursor may be performed, for example, in the air at about 600° C. to about 1200° C., for example, about 700° C. to about 1100° C., or for example about 750° C. to about 1000° C.

The conducting or semiconducting oxide obtained through the calcination may be a powder having a predetermined crystal structure including barium or strontium, titanium, and a donor element. For example, the conducting or semiconducting oxide may have a modified perovskite structure where a part of a barium (Ba) or strontium (Sr) site in $BaTiO_3$ or $SrTiO_3$ having a perovskite structure is substituted with the donor element. The conducting or semiconducting oxide may have an oxygen vacancy, and the conductivity of the conducting or semiconducting oxide may be determined by a doping amount of the donor element and/or an amount of the oxygen vacancy.

Following the calcination, a mixture of the conducting or semiconducting oxide and the acceptor element precursor is prepared.

The acceptor element precursor may be a compound capable of supplying an acceptor element. Herein, the acceptor element precursor may have a form of a liquid phase, such as a solution, which is obtained by dissolving the acceptor element precursor in a solvent, or a dispersion obtained by dispersing the acceptor element precursor in a dispersive medium. For example, the acceptor element precursor may be a material configured to be dissolved or dispersed in water or an organic solvent, and for example, may include nitrate, chloride, or a combination thereof, which include an acceptor element. The nitrate, the chloride, or the combination thereof including an acceptor element may be dissolved or dispersed in water or an organic solvent. The organic solvent may be, for example, an alcohol such as ethanol but is not limited thereto. The acceptor element may be, for example, a trivalent element and including manganese (Mn), magnesium (Mg), aluminum (Al), iron (Fe), scandium (Sc), gallium (Ga), or a combination thereof.

The acceptor element precursor may be, for example, included in an amount of about 0.1 mole (mol) to about 5 mols, for example, about 0.2 mols to about 4 mols, or for example, about 0.3 mols to about 3 mols, based on 100 mols of the conducting or semiconducting oxide. The acceptor element precursor may be included in an amount of about 0.1 mol % to about 5 mol %, or about 0.5 mol % to about 5 mol %, or about 1 mol % to about 4.5 mol %, based on a total amount of moles in the mixture.

The mixture may further include a sintering agent. The sintering agent is a component capable of facilitating sintering in a subsequent sintering process, and which may be supplied along with the conducting or semiconducting oxide and the acceptor element precursor, or may be separately added after mixing the conducting or semiconducting oxide and the acceptor element precursor.

The sintering agent may be supplied in a form of a liquid phase, that is, a solution obtained by dissolving the sintering agent in a solvent, or as a dispersion obtained by dispersing the sintering agent in a dispersive medium. For example, the sintering agent may include tetramethylorthosilicate, tetraethylorthosilicate, tetramethylsilane, tetraethylsilane, a silicon (Si)-containing nitrate, a silicon (Si)-containing acetate, or a combination thereof, each of which is capable of being dissolved or dispersed in water or an organic solvent. The organic solvent may be, for example an alcohol solvent such as ethanol, but is not limited thereto. The liquid-phase sintering agent may include the tetramethylorthosilicate, tetraethylorthosilicate, tetramethylsilane, tetraethylsilane, silicon (Si)-containing nitrate, silicon (Si)-containing acetate, or combination thereof which is dissolved or dispersed in water or an organic solvent.

The sintering agent may be added in an amount which is less than an amount of the acceptor element precursor. For example, the sintering agent and the acceptor element precursor may be present in a mole ratio of sintering agent to acceptor element precursor of about 0.1:1 to about 0.9:1. The sintering agent may be included in an amount of about 0.1 mols to about 4.5 mols, for example, about 0.1 mols to about 2 mols, or about 0.1 mols to about 1.5 mols, based on 100 mols of the conducting or semiconducting oxide.

The mixture including the conducting or semiconducting oxide, the liquid-phase acceptor element precursor, and the liquid-phase sintering agent may be dried at room temperature or at a temperature greater than a boiling point of the solvent.

Subsequently, the mixture including the conducting or semiconducting oxide, the liquid-phase acceptor element precursor, and the liquid-phase sintering agent may be molded into a predetermined shape. The molding may include, for example, compression molding such as cold compression molding, but is not limited thereto. For example, the mixture may be pressed at about 100 megapascals (MPa) to about 500 MPa, or about 200 MPa to about 400 MPa, to provide a three-dimensional molded body such as a disk.

Then, the molded body is sintered to provide a ceramic dielectric. The sintering may be, for example, performed under an air, $N_2$ gas, $H_2$ gas, or $N_2/H_2$ mixed gas atmosphere at a high temperature. For example, the sintering may be conducted at a temperature of greater than or equal to about 1000° C. For example, in the $N_2/H_2$ mixed gas, a $N_2$:$H_2$ volume ratio may be for example about 1:99 to about 99:1, about 10:90 to about 90:10, about 20:80 to about 80:20, about 30:70 to about 70:30, about 40:60 to about 60:40, or about 50:50. A sintering temperature may be for example about 1100° C. to about 1400° C., for example about 1100° C. to about 1300° C. A sintering time may be for example about 1 hour to about 12 hours, about 1 hour to about 6 hours, about 1 hour, or 4 hours. The sintering may be, for example, performed under a reduction atmosphere.

The method may further include an additional step of heat-treating the ceramic dielectric after the sintering step. The additional heat-treating may be, for example, performed in an oxidizing atmosphere. The additional heat-treating step may be, for example, performed at a temperature which is less than the sintering temperature and may be, for example, performed under an air and/or $N_2$ atmosphere and at a temperature of about 600° C. to about 800° C. The additional heat-treating step may be performed for about 30 minutes to about 6 hours, or about 1 hour to about 4 hours.

The obtained ceramic dielectric may be a three-dimensional structured, bulk dielectric including a plurality of grains and a grain boundary between adjacent grains.

Figure 1B:
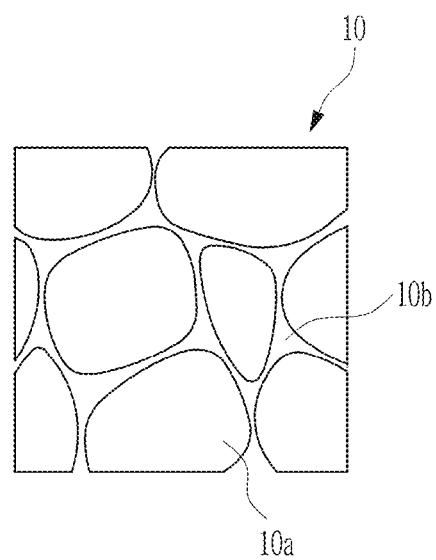
FIG. 1B is an expanded view of the circled portion in FIG. 1.

FIGS. 1A and 1B is a schematic view showing a ceramic dielectric according to an embodiment.

A ceramic dielectric 10 according to an embodiment may have a disk shape as shown in FIG. 1A, and includes a plurality of grains 10a and a grain boundary 10b disposed between adjacent grains 10a (FIG. 1B). A "grain" as used herein means a particle or region of a particle having a single crystallographic orientation.

The grains 10a may include the conducting or semiconducting oxide including barium derived from the barium precursor or strontium derived from the strontium precursor, titanium derived from the titanium precursor, and a donor element derived from the donor element precursor as described above, wherein the donor element may include lanthanum (La), yttrium (Y), bismuth (Bi), dysprosium (Dy), gadolinium (Gd), neodymium (Nd), samarium (Sm), holmium (Ho), or a combination thereof.

For example, the conducting or semiconducting oxide may have a structure represented by Chemical Formula 1.

[Chemical Formula 1]

In Chemical Formula 1,

D may be at least one donor element, for example lanthanum (La), yttrium (Y), bismuth (Bi), dysprosium (Dy), gadolinium (Gd), neodymium (Nd), samarium (Sm), holmium (Ho), or a combination thereof, $0<x\leq0.02$, and $0<\delta<3$.

In Chemical Formula 1, x denotes a degree of substitution of the donor element and may be, for example, in the range of $0<x\leq0.01$.

In Chemical Formula 1, δ denotes a degree of oxygen vacancy and may be, for example, in the range of $0.1\leq\delta<3$, $0.2\leq\delta\leq2.8$, $0.3\leq\delta\leq2.5$, $0.4\leq\delta\leq2.3$, or $0.5\leq\delta\leq2.0$.

The size of the grains 10a may vary, and may be within a range of about 0.001 μm (1 nm) to about 10 μm, for example about 0.001 μm to about 8 μm, about 0.01 μm to about 7 μm, about 0.01 μm to about 6 μm, about 0.01 μm to about 5 μm, about 0.01 μm to about 4 μm, or about 0.01 μm to about 3 μm.

An average grain size of the grains 10a may be for example less than or equal to about 2.0 μm, less than or equal to about 1.8 μm, less than or equal to about 1.7 μm, less than or equal to about 1.5 μm, less than or equal to about 1.4 μm, less than or equal to about 1.3 μm, less than or equal to about 1.2 μm, less than or equal to about 1.1 μm, less than or equal to about 1.0 μm, less than or equal to about 900 nm, less than or equal to about 800 nm, less than or equal to about 700 nm, less than or equal to about 600 nm, less than or equal to about 500 nm, or less than or equal to about 300 nm, and for example, greater than or equal to about 50 nm, greater than or equal to about 60 nm, greater than or equal to about 70 nm, greater than or equal to about 80 nm, greater than or equal to about 90 nm, or greater than or equal to about 100 nm, but is not limited thereto.

The grain boundary 10b may include an insulating oxide including an acceptor element derived from the acceptor element precursor. The insulating oxide may be, for example, represented by the formula $A_2O_3$ in which A is an acceptor element and includes manganese (Mn), magnesium (Mg), aluminum (Al), iron (Fe), scandium (Sc), gallium (Ga), or a combination thereof.

The acceptor element precursor is supplied in a form of a liquid phase as described above, and accordingly, may be prevented from agglomeration. Thus, the acceptor element precursor may form a grain boundary 10b having a dense structure, in which the acceptor elements are substantially uniformly distributed in the grain boundary 10b.

The grain boundary 10b may include the element silicon (silicon element) derived from the sintering agent. The sintering agent is supplied in a form of a liquid phase as described above and thus may be prevented from agglomeration and form the grain boundary 10b having a dense structure in which the silicon element is substantially uniformly distributed in the grain boundary 10b.

The grain boundary 10b may be disposed between adjacent grains and may have a structure which is continuously connected. The grain boundary may have a thinner width than a particle diameter of the grains. For example, a width of the grain boundary may be within about 20%, for example, about 15%, or for example, about 10% of the particle diameter of the grains.

In this way, a ceramic dielectric includes a thin grain boundary disposed between adjacent conductive or semiconductive grains. The grain boundary includes an insulating oxide and thus the ceramic dielectric may simultaneously possess both high permittivity and resistivity.

Hereinafter, a ceramic electronic component including the ceramic dielectric, according to an embodiment, is described.

Figure 2:
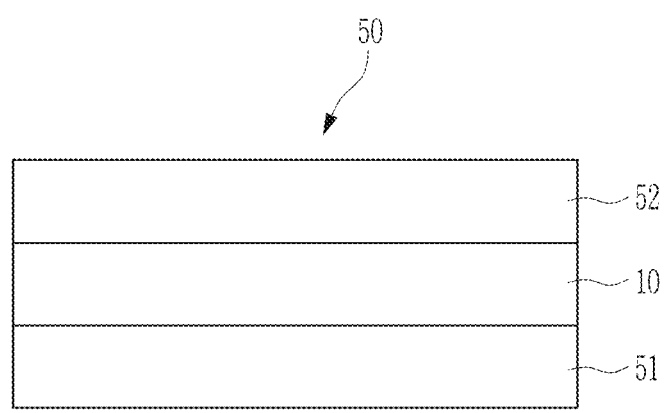
FIG. 2 is a schematic view showing a ceramic electronic component, according to an embodiment.

FIG. 2 is a schematic view of a ceramic electronic component according to an embodiment.

FIG. 2 shows a capacitor 50 that is an example of the ceramic electronic component.

Referring to FIG. 2, a capacitor 50 according to an embodiment includes a pair of electrodes 51 and 52 facing each other and a ceramic dielectric 10.

The pair of electrodes 51 and 52 include a conductor such as a metal. The metal may include, for example nickel (Ni), gold (Au), platinum (Pt), palladium (Pd), copper (Cu), silver (Ag), tin (Sn), an alloy thereof, or a combination thereof, but is not limited thereto. The pair of electrodes 51 and 52 may include a metal plate, for example a conductive layer, disposed on a substrate (not shown), or a metal-coated plate disposed on a substrate (not shown). Herein, the substrate may be for example a glass substrate, a semiconductor substrate, a polymer substrate, or a combination thereof.

The ceramic dielectric 10 is the same as described above.

Figure 3:
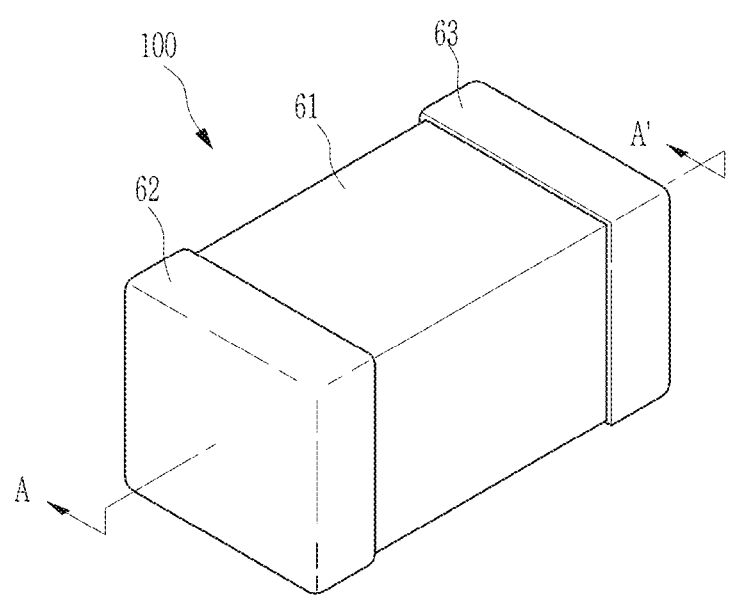
FIG. 3 is a schematic perspective view showing a ceramic electronic component, according to another embodiment.
Figure 4:
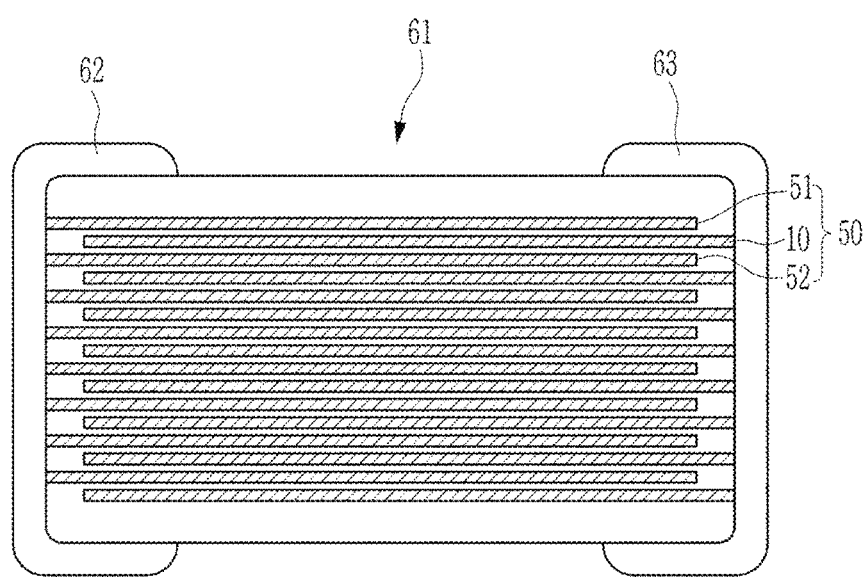
FIG. 4 is a cross-sectional view showing the ceramic electronic component taken along the line A-A of FIG. 3.

FIG. 3 is a schematic perspective view of a ceramic electronic component according to another embodiment and FIG. 4 is a cross-sectional view of the ceramic electronic component of FIG. 3 taken along the direction indicated by line A-A'.

The ceramic electronic component according to the present embodiment in FIGS. 3 and 4, is a multilayer ceramic capacitor (MLCC) 100 having a stacked structure wherein a plurality of the capacitors of FIG. 2 are stacked together to provide a unit capacitor.

Referring to FIGS. 3 and 4, the multilayer ceramic capacitor 100 includes a capacitor body 61 and external electrodes 62 and 63. The capacitor body 61 may have a stacked structure wherein a plurality of the capacitors 50 of FIG. 2 are stacked, and each of the capacitors includes the electrode (internal electrodes) 51 and 52 and the ceramic dielectric 10 as described above. The details therefor are the same as described above.

The ceramic electronic component, the capacitor, and the multi-layer ceramic capacitor described above, are provided as examples, but the present disclosure is not limited thereto, and the ceramic dielectric may be applied to all types electronic components that include a ceramic dielectric, such as a piezoelectric device, a varistor, or a thermistor.

The ceramic electronic component such as the capacitor and the multi-layer ceramic capacitor may be included in a variety of devices, for example, may be employed for an image device such as a liquid crystal display (LCD), a computer, a mobile phone, and the like.

Hereinafter, the embodiments are illustrated in more detail with reference to examples. However, these examples are exemplary, and the present scope is not limited thereto.

Synthesis Example

Synthesis Example 1

49.4 mol % of $BaCO_3$, 49.4 mol % of $TiO_2$, and 1.2 mol % of $La_2O_3$ are added to ethanol and then, uniformly mixed with a ball mill for 10 hours. Subsequently, the mixed powder is dried, while being mixed in a beaker with a magnetic bar and a hot plate. The dried powder is additionally dried in an oven at 100° C. for a day (about 24 hours). Then, the mixture is calcinated at 900° C. in the air for 2 hours to prepare a La-doped barium titanium oxide.

Subsequently, 2 mol % of manganese nitrate ($Mn(NO_3)_2$) and 0.5 mol % of tetraethylorthosilicate are added to the obtained La-doped barium titanium oxide, using ethanol as a solvent, and then uniformly mixed by using a ball mill for 6 hours. Then, the mixture is additionally dried at 100° C. in an oven for one day (about 24 hours). The dried powder is molded into a disk shape with a uniaxial press, and the density of the disk-shaped mixture is increased by pressing the mixture in a cold isostatic press at a pressure of 250 MPa to obtain a disk-shaped molded specimen. Subsequently, the molded specimen is sintered under a dry $N_2/H_2$ mixed gas ($H_2$ 1%, 700 cubic centimeters per minute (cc/m)) atmosphere at 1200° C. for 2 hours. Then, the sintered body is reoxidized under the air atmosphere at 700° C. for about 2 hours to obtain a ceramic dielectric.

Synthesis Example 2

A ceramic dielectric is obtained according to the same method as Synthesis Example 1 except that 49.9 mol % of $BaCO_3$, 49.9 mol % of $TiO_2$, and 0.2 mol % of $La_2O_3$ are used instead of 49.4 mol % of $BaCO_3$, 49.4 mol % of $TiO_2$, and 1.2 mol % of $La_2O_3$, and 1.5 mol % of manganese nitrate and 0.5 mol % of tetraethylorthosilicate are used instead of 2 mol % of manganese nitrate and 0.5 mol % of tetraethylorthosilicate.

Synthesis Example 3

A ceramic dielectric is obtained according to the same method as Synthesis Example 1 except that 49.9 mol % of $BaCO_3$, 49.9 mol % of $TiO_2$, and 0.2 mol % of $La_2O_3$ are used instead of 49.4 mol % of $BaCO_3$, 49.4 mol % of $TiO_2$, and 1.2 mol % of $La_2O_3$, and 1.0 mol % of manganese nitrate ($Mn(NO_3)_2$) and 0.5 mol % of tetraethylorthosilicate are used instead of 2 mol % of manganese nitrate and 0.5 mol % of tetraethylorthosilicate.

Comparative Synthesis Example 1

A ceramic dielectric is obtained according to the same method as Synthesis Example 1, except that 2 mol % of $MnCO_3$ powder and 0.5 mol % of $SiO_2$ powder are used instead of 2 mol % of the manganese nitrate and 0.5 mol % of the tetraethylorthosilicate.

Comparative Synthesis Example 2

A ceramic dielectric is obtained according to the same method as Synthesis Example 1, except that 49.6 mol % of $BaCO_3$, 49.6 mol % of $TiO_2$, and 0.8 mol % of $La_2O_3$ are used instead of 49.4 mol % of $BaCO_3$, 49.4 mol % of $TiO_2$, and 1.2 mol % of $La_2O_3$, and 2 mol % of $MnCO_3$ powder and 0.5 mol % of $SiO_2$ powder are used instead of 2 mol % of the manganese nitrate and 0.5 mol % of the tetraethylorthosilicate.

Comparative Synthesis Example 3

A ceramic dielectric is obtained according to the same method as Synthesis Example 1 except that 49.8 mol % of $BaCO_3$, 49.8 mol % of $TiO_2$, and 0.4 mol % of $La_2O_3$ are used instead of 49.4 mol % of $BaCO_3$, 49.4 mol % of $TiO_2$, and 1.2 mol % of $La_2O_3$, and 1.2 mol % of $MnCO_3$ powder and 1 mol % of $SiO_2$ powder are used instead of 2 mol % of the manganese nitrate and 0.5 mol % of the tetraethylorthosilicate.

Evaluation I

Elemental distributions of the ceramic dielectrics obtained from the Synthesis Examples and the Comparative Synthesis Examples are confirmed.

Figure 5:
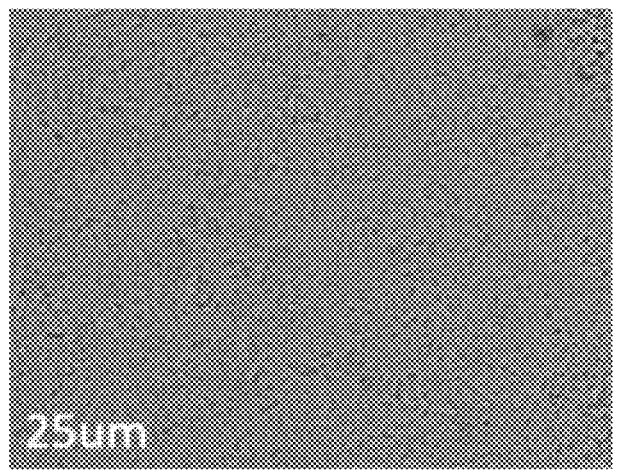
FIG. 5 is an electric field emission electron scanning microscope (FE-SEM) photograph of the ceramic dielectric obtained in Synthesis Example 1.
Figure 6:
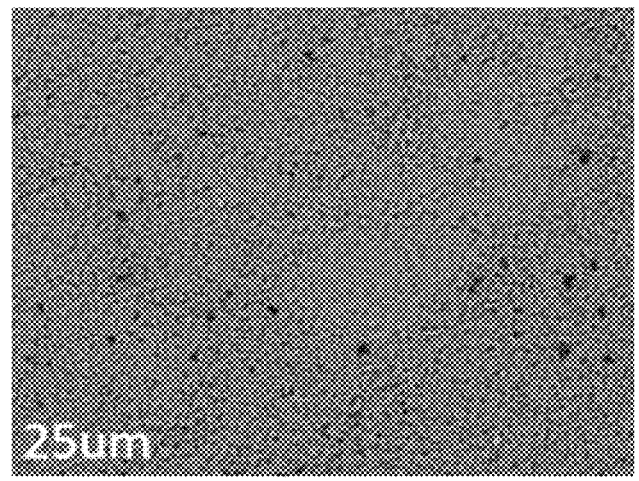
FIG. 6 is a FE-SEM photograph of the ceramic dielectric obtained in Comparative Synthesis Example 1.

FIG. 5 is an electric field emission electron scanning microscope (FE-SEM) photograph of the ceramic dielectric obtained in Synthesis Example 1 and FIG. 6 is a FE-SEM photograph of the ceramic dielectric obtained in Comparative Synthesis Example 1.

Referring to FIGS. 5 and 6, in the ceramic dielectric of Synthesis Example 1, an aggregate is not observed, but in the ceramic dielectric of Comparative Synthesis Example 1, a plurality of aggregates (black dots) is observed.

Figure 7:
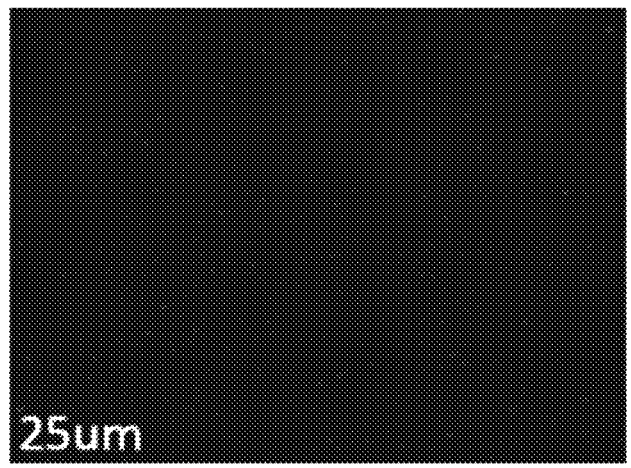
FIG. 7 is an energy dispersive spectroscopy (EDS) photograph showing a distribution of a manganese element (Mn) in the ceramic dielectric obtained in Synthesis Example 1.
Figure 8:
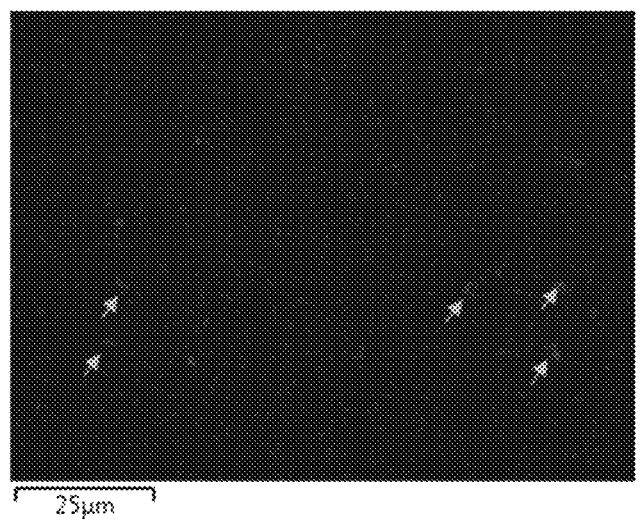
FIG. 8 is an energy dispersive spectroscopy (EDS) photograph showing a distribution of a manganese element (Mn) in the ceramic dielectric obtained in Comparative Synthesis Example 1.

FIG. 7 is an energy dispersive spectroscopy (EDS) photograph showing a distribution of a manganese element (Mn) in the ceramic dielectric obtained in Synthesis Example 1 and FIG. 8 is an energy dispersive spectroscopy (EDS) photograph showing a distribution of a manganese element (Mn) in the ceramic dielectric obtained in Comparative Synthesis Example 1.

Referring to FIGS. 7 and 8, in the ceramic dielectric of Synthesis Example 1, the Mn element is substantially uniformly distributed without an Mn aggregate, but in ceramic dielectric of Comparative Synthesis Example 1, a plurality of Mn aggregates (bright parts) is observed.

Figure 9:
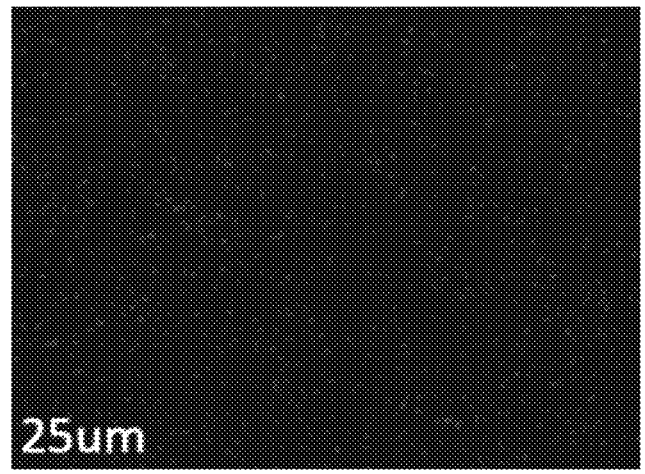
FIG. 9 is an energy dispersive spectroscopy (EDS) photograph showing a distribution of a silicon element (Si) in the ceramic dielectric obtained in Synthesis Example 1.
Figure 10:
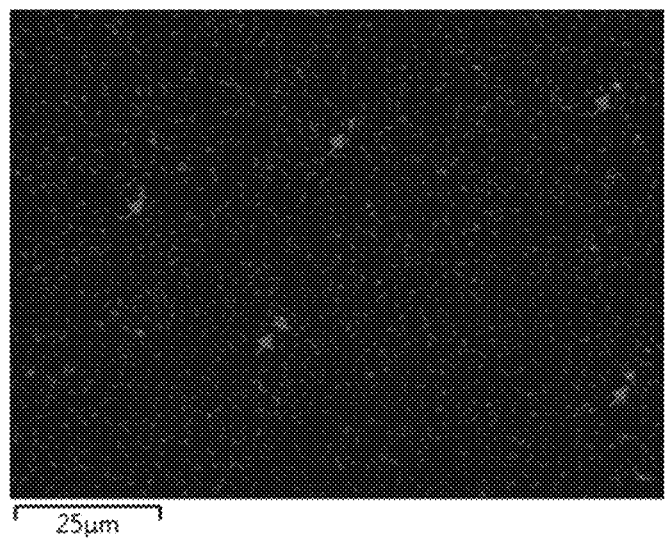
FIG. 10 is an energy dispersive spectroscopy (EDS) photograph showing a distribution of a silicon element (Si) in the ceramic dielectric obtained in Comparative Synthesis Example 1.

FIG. 9 is an energy dispersive spectroscopy (EDS) photograph showing a distribution of a silicon element (Si) in the ceramic dielectric obtained in Synthesis Example 1, and FIG. 10 is an energy dispersive spectroscopy (EDS) photograph showing a distribution of a silicon element (Si) in the ceramic dielectric obtained in Comparative Synthesis Example 1.

Referring to FIGS. 9 and 10, in the ceramic dielectric of Synthesis Example 1, a Si aggregate is not observed, and the Si element is substantially uniformly distributed, but in the ceramic dielectric of Comparative Synthesis Example 1, a plurality of Si aggregates (bright parts) is observed.

Figure 11:
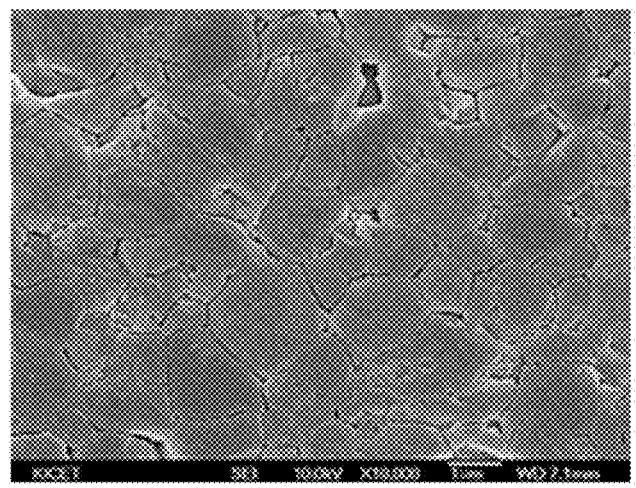
FIG. 11 is a transmission electron microscopy (TEM) photograph showing a fine structure of the ceramic dielectric obtained in Synthesis Example 1.
Figure 12:
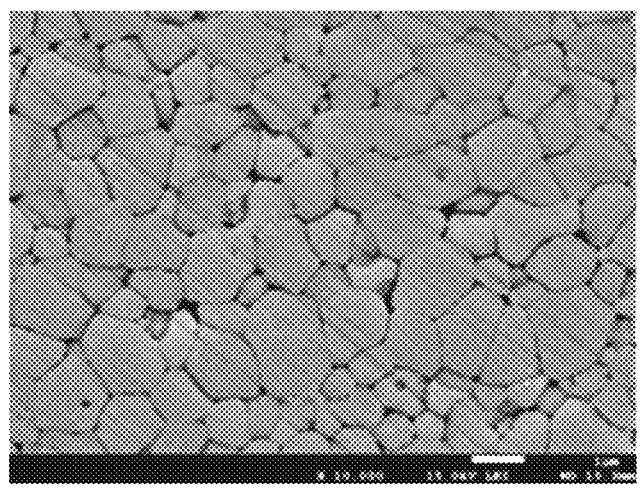
FIG. 12 is a transmission electron microscopy (TEM) photograph showing a fine structure of the ceramic dielectric obtained in Comparative Synthesis Example 1.

FIG. 11 is a transmission electron microscopy (TEM) photograph showing a fine structure of the ceramic dielectric obtained in Synthesis Example 1 and FIG. 12 is a transmission electron microscopy (TEM) photograph showing a fine structure of the ceramic dielectric obtained in Comparative Synthesis Example 1.

Referring to FIGS. 11 and 12, in the ceramic dielectric of Synthesis Example 1, a dense grain boundary is formed between adjacent grains, but in the ceramic dielectric of Comparative Synthesis Example 1, a plurality of pores is observed between adjacent grains, and accordingly, a grain boundary having low density is formed between the adjacent grains.

EXAMPLES

Example 1

A capacitor is manufactured by coating In—Ga on both surfaces of the ceramic dielectric prepared according to Synthesis Example 1 to form an electrode.

Example 2

A capacitor is manufactured by coating In—Ga on both surfaces of the ceramic dielectric according to Synthesis Example 2 to form an electrode.

Example 3

A capacitor is manufactured by coating In—Ga on both surfaces of the ceramic dielectric according to Synthesis Example 3 to form an electrode.

Comparative Example 1

A capacitor is manufactured by coating In—Ga on both surfaces of the ceramic dielectric according to Comparative Synthesis Example 1 to form an electrode.

Comparative Example 2

A capacitor is manufactured by coating In—Ga on both surfaces of the ceramic dielectric according to Comparative Synthesis Example 2 to form an electrode.

Comparative Example 3

A capacitor is manufactured by coating In—Ga on both surfaces of the ceramic dielectric according to Comparative Synthesis Example 3 to form an electrode.

Evaluation II

A permittivity and a resistivity of the capacitors according to Examples and Comparative Examples are evaluated.

The permittivity is evaluated by using a 4284A LCR meter, and the resistivity is evaluated by using Keytheley 2400.

The results are show in Table 1.

TABLE 1

|  | Permittivity | Resistivity ($\Omega \cdot cm$) |
| --- | --- | --- |
| Example 1 | 8,818 | $4.99 \times 10^{11}$ |
| Example 2 | 8,520 | $1.84 \times 10^{12}$ |
| Example 3 | 19,583 | $2.06 \times 10^{10}$ |
| Comparative Example 1 | 5,026 | $1.30 \times 10^{10}$ |
| Comparative Example 2 | 2,850 | $2.94 \times 10^{11}$ |
| Comparative Example 3 | 2,319 | $9.16 \times 10^{10}$ |

Referring to Table 1, the capacitors according to Examples 1-3 exhibit a higher permittivity and higher or comparable resistivity than the capacitors according to the Comparative Examples.

While this disclosure has been described in connection with what is presently considered to be practical example embodiments, it is to be understood that the invention is not limited to the disclosed embodiments. On the contrary, it is intended to cover various modifications and equivalent arrangements included within the spirit and scope of the appended claims.

What is claimed is:

1. A method of manufacturing a ceramic dielectric, comprising:
   heat-treating a barium precursor or a strontium precursor, a titanium precursor, and a donor element precursor to obtain a conducting or semiconducting oxide,
   preparing a mixture comprising the conducting or semiconducting oxide and a liquid-phase acceptor element precursor,
   supplying a liquid-phase sintering agent to the mixture, and
   sintering the mixture to form a ceramic dielectric,
   wherein the ceramic dielectric comprises a plurality of grains and a grain boundary between adjacent grains and being continuously connected,
   the plurality of grains comprising the conducting or semiconducting oxide, and
   the grain boundary comprises an insulating oxide comprising an acceptor element derived from the liquid-phase acceptor element precursor.

2. The method of claim 1, wherein the liquid-phase acceptor element precursor comprises a nitrate, a chloride, or a combination thereof comprising an acceptor element, the acceptor element comprising manganese, magnesium, aluminum, iron, scandium, gallium, or a combination thereof.

3. The method of claim 2, wherein the nitrate, the chloride, or the combination thereof comprising the acceptor element is dissolved or dispersed in water or an organic solvent.

4. The method of claim 1, wherein the liquid-phase sintering agent comprises tetramethylorthosilicate, tetraethylorthosilicate, tetramethylsilane, tetraethylsilane, a silicon-containing nitrate, a silicon-containing acetate, or a combination thereof.

5. The method of claim 4, wherein the tetramethylorthosilicate, tetraethylorthosilicate, tetramethylsilane, tetraethylsilane, silicon-containing nitrate, silicon-containing acetate, or the combination thereof is dissolved or dispersed in water or an organic solvent.

6. The method of claim 1, wherein the liquid-phase sintering agent is supplied in an amount which is less than an amount of the acceptor element precursor.

7. The method of claim 6, wherein a mole ratio of the sintering agent to the acceptor element precursor is about 0.1:1 to about 0.9:1.

8. The method of claim 1, wherein the donor element precursor comprises lanthanum, yttrium, bismuth, dysprosium, gadolinium, neodymium, samarium, holmium, or a combination thereof.

9. The method of claim 1, wherein the donor element precursor is present in an amount of less than or equal to about 3 mole percent, based on a total amount of moles of the barium precursor or the strontium precursor, the titanium precursor, and the donor element precursor.

10. The method of claim 9, wherein the mole ratio of the barium precursor or the strontium precursor to the titanium precursor is about 0.8:1.2 to about 1.2:0.8.

11. The method of claim 1, wherein the acceptor element precursor is present in an amount of about 0.1 mole percent to about 5 mole percent, based on total amount of moles in the mixture.

12. The method of claim 1, further comprising compression-molding the mixture before the sintering of the mixture.

13. The method of claim 1, further comprising heat-treating the ceramic dielectric at a temperature less than the sintering temperature after the sintering of the mixture.

14. A ceramic dielectric comprising:
a plurality of grains comprising a conducting or semiconducting oxide comprising barium or strontium, titanium, and a donor element, and
a grain boundary disposed between adjacent grains and being continuously connected, the grain boundary comprising an insulating oxide comprising an acceptor element, the insulating oxide being substantially uniformly distributed in the grain boundary,
wherein the donor element comprises lanthanum, yttrium, bismuth, dysprosium, gadolinium, neodymium, samarium, holmium, or a combination thereof, and
the acceptor element comprises manganese, aluminum, iron, scandium, gallium, or a combination thereof.

15. The ceramic dielectric of claim 14, wherein the grain boundary further comprises a silicon element that is substantially uniformly distributed in the grain boundary.

16. A ceramic electronic component comprising:
a pair of electrodes facing each other, and
a ceramic dielectric layer disposed between the pair of electrodes,
wherein the ceramic dielectric layer comprises the ceramic dielectric of claim 14.

17. The ceramic electronic component of claim 16, wherein the ceramic electronic component comprises a multilayer ceramic capacitor in which a plurality of unit capacitors comprising the pair of electrodes and the ceramic dielectric layer, are stacked.

18. An electronic device comprising the ceramic electronic component of claim 16.

* * * * *